M. HAFELE.
PORTABLE-FENCE.
No. 173,403. Patented Feb. 15, 1876.
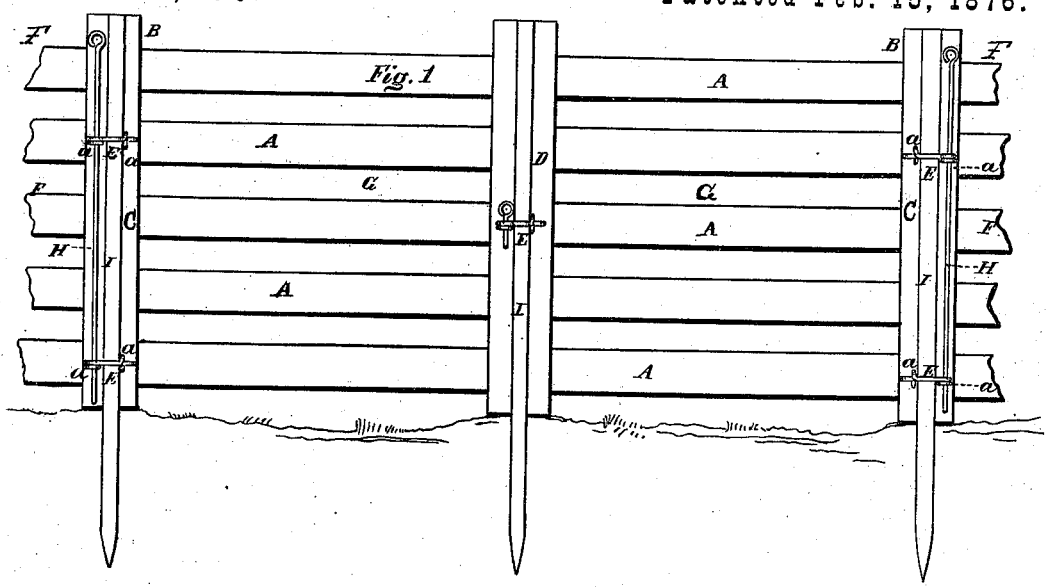
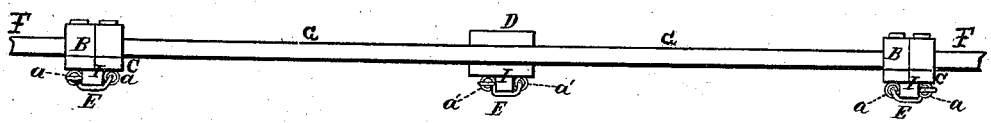
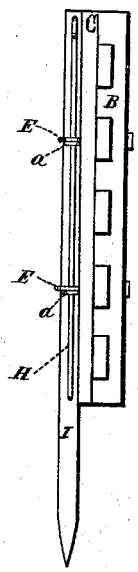
Witnesses.
E. W. Cross
John Price
Inventor
M. Hafele
Per Burridge & Co.
Attys.

UNITED STATES PATENT OFFICE.

MICHAEL HAFELE, OF OLMSTED, OHIO.

IMPROVEMENT IN PORTABLE FENCES.

Specification forming part of Letters Patent No. 173,403, dated February 15, 1876; application filed January 12, 1876.

*To all whom it may concern:*

Be it known that I, MICHAEL HAFELE, of Olmsted, in the county of Cuyahoga and State of Ohio, have invented a certain new and Improved Portable Farm-Fence; and I do hereby declare that the following is a full, clear, and complete description thereof, reference being had to the accompanying drawings, making a part of the same.

Figure 1 is a side view of the fence. Fig. 2 is a plan view. Fig. 3 is an end view.

Like letters of reference refer to like parts in the several views.

This invention is a fence for farm use, and the special object of the same is to render the fence portable, so that it can be readily and easily constructed, and be removed from one place to another, as circumstances may make it expedient. Said fence is constructed substantially as follows:

In the drawings, A represents the rails or bars of the fence, the ends of which are secured in the posts B. Each of said posts may consist either of a single piece of timber with gains cut therein for the admission of the ends of the bars, which are retained therein by a cleat, C, or the post may be of one piece of timber, with mortises cut for the admission of the bars, thereby dispensing with the cleat referred to. The centers of the bars are supported by cleats D, one on each side of them, and which are secured to each other and to the bars by nails or other suitable means. G, Fig. 1, represents one panel or section of a fence. All the other sections are constructed substantially in the same way, and are connected to each other as follows:

In the end posts of each of the sections are inserted eyes or staples a, as shown in Fig. 1, to which are attached the bow-links E, whereby the sections are strongly secured to each other, as shown in Fig. 1. F F represent two sections or panels attached by the links E to the panel G.

It will be seen in said Fig. 1 that one end of the links is hooked into the staples of section G of the fence, while their opposite ends are attached to sections F, or the adjoining panels by a removable rod, H, inserted in the eye formed in the end of the link, and through the staples in the post.

The above-described fence, when set up, is supported by stakes I inserted under the links and driven into the ground, as will be seen in Figs. 1 and 3. The special advantage of this fence is that it can be made cheaply, and by any ordinary person, in a shop or other place, and the same be carried and put up where wanted, and to any extent required, and can be easily and readily taken down to be used elsewhere, or for being stored away until wanted.

A further desirable feature in this fence is that it can be passed through at any part of it by wagons, cattle, &c., by simply withdrawing one of the rods H, and lifting the stakes; the panel can then be swung around as a gate for a passage-way.

What I claim as my invention, and desire to secure by Letters Patent, is—

The bow-links E, staples or eyes a, rods H, and stakes I, in combination with the fence-panels G and F, substantially in the manner as set forth, and for the purpose specified.

MICHAEL HAFELE.

Witnesses:
 J. H. BURRIDGE,
 WM. NERACHER.